United States Patent [19]

Van Appledorn

[11] Patent Number: 4,548,544
[45] Date of Patent: Oct. 22, 1985

[54] ROBOT APPARATUS PARTICULARLY ADAPTED FOR REMOVING AND HANDLING DIE CAST PARTS

[75] Inventor: William Van Appledorn, Holland, Mich.

[73] Assignee: Prince Corporation, Holland, Mich.

[21] Appl. No.: 454,659

[22] Filed: Dec. 30, 1982

[51] Int. Cl.⁴ .................. B21J 13/10; B65G 65/02
[52] U.S. Cl. .................. 414/751; 414/917; 901/22
[58] Field of Search .......... 414/917, 749–753, 414/744 A, 4; 901/22, 26

[56] References Cited

U.S. PATENT DOCUMENTS

| | | | |
|---|---|---|---|
| 521,256 | 6/1894 | Browne | 414/917 X |
| 2,500,815 | 3/1950 | Gerli et al. | 414/917 X |
| 3,061,118 | 10/1962 | Halberstadt | 414/917 X |
| 3,262,593 | 7/1966 | Hainer | 214/651 |
| 3,731,821 | 5/1973 | Wallis | 214/1 BB |
| 3,927,424 | 12/1975 | Itoh | 3/12.6 |
| 3,976,204 | 8/1976 | Dawson | 214/1 BB |
| 4,003,477 | 1/1977 | Kroppenstedt | 214/1 QB |
| 4,188,165 | 2/1980 | Bohme et al. | 414/694 |
| 4,234,150 | 11/1980 | Mee et al. | 414/4 X |
| 4,284,381 | 8/1981 | Minato | 414/61 |
| 4,345,864 | 8/1982 | Smith, Jr. et al. | 414/917 X |
| 4,411,587 | 10/1983 | Niki | 414/752 |
| 4,441,852 | 4/1984 | Dixon | 414/733 |

FOREIGN PATENT DOCUMENTS

| | | | |
|---|---|---|---|
| 20552 | 2/1977 | Japan | 414/917 |
| 601154 | 4/1978 | U.S.S.R. | 414/917 |
| 642149 | 1/1979 | U.S.S.R. | 414/917 |
| 697316 | 11/1979 | U.S.S.R. | 414/917 |

*Primary Examiner*—Terrance L. Siemens
*Attorney, Agent, or Firm*—Price, Heneveld, Huizenga & Cooper

[57] ABSTRACT

An extractor arm for a die cast machine providing improved linear movement of the claw supported by the arm. The arm includes a support portion, a knee portion, a claw portion, and two sub-arm assemblies—a first sub-arm assembly interconnecting the support portion and the knee portion and a second sub-arm assembly interconnecting the knee portion and the claw portion. The two sub-arm assemblies each define a flexing parallelogram, and structure is provided for maintaining the two flexing parallelograms in generally the same shape throughout movement of the arm. The claw portion is therefore geometrically transported along a linear path relative the support portion.

19 Claims, 8 Drawing Figures

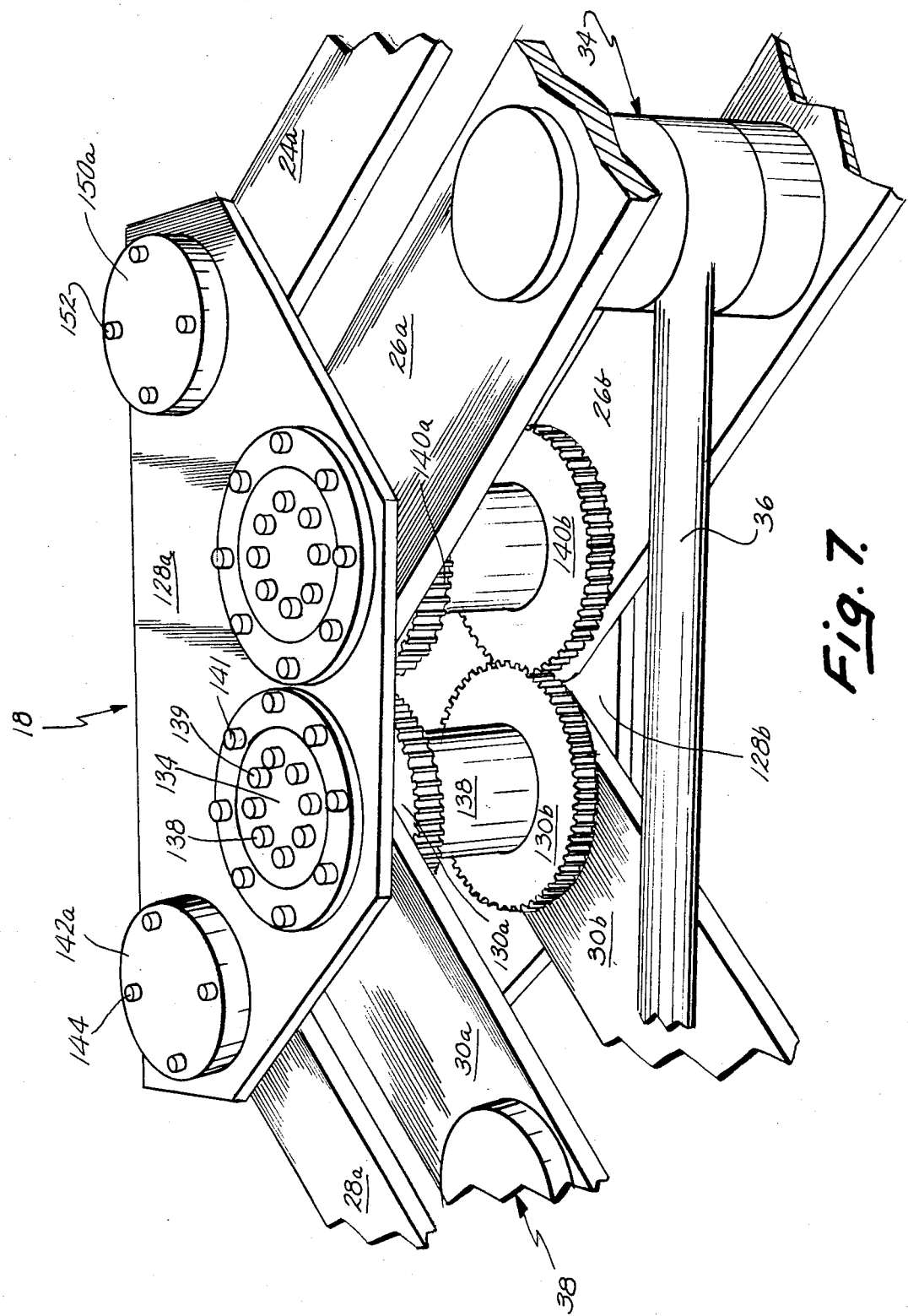

ROBOT APPARATUS PARTICULARLY ADAPTED FOR REMOVING AND HANDLING DIE CAST PARTS

BACKGROUND OF THE INVENTION

The present invention relates to a robot apparatus particularly adapted for removing and handling die cast parts and more particularly to an extractor arm for handling die cast parts.

A die cast machine includes a mold and an inlet port for injecting molten moldable material into the mold. A die cast article is formed by closing the mold, injecting the molten material through the inlet port into the mold, allowing the material to solidify, opening the mold, and removing the molded article. The relatively hot, and often heavy, molded article typically is mechanically removed from the mold and delivered to the next processing machine, for example a trim press, for further processing of the article. If removed manually, a danger or hazard to the worker exists. Therefore, mechanical devices have been used to some extent. Several known devices for extracting the die cast articles from the die cast machine are "robot-like" devices to repetitively perform the rote, mechanical activity of removing the articles from the die cast machine and delivering the articles to the next processing station.

However, known extractor devices are not without their drawbacks. A first known extractor device includes a claw, a telescoping arm supporting the claw, and a support structure pivotally supporting the telescoping arm for movement in a substantially vertical plane. Control of the vertical claw position is difficult because the claw can be vertically positioned only by pivoting the arm at the support means. Because the claw is typically located remotely (for example 2 to 15 feet) from the pivot, slight errors in the angular orientation of the arm result in large errors in the vertical position of the claw. Further, devices having single linear motion have problems with long strokes bearing weight at the end of the arm. In addition, in the isolated case wherein the arm is positioned horizontally, the claw cannot be moved in a horizontal plane as is desirable to cleanly remove the die cast article from the die cast machine.

A second known extractor device includes a claw, an arm supporting the claw, and a support structure supporting the arm. The arm includes three pivotal interconnections, denominated a "shoulder" connected to the support structure, an "elbow," and a "wrist" supporting the claw. Separate hydraulic cylinders are connected to at least both the elbow and the wrist and are independently controlled to attempt to move the claw supported on the wrist in a substantially horizontal plane. However, accurately controlling the independent cylinders to effect horizontal movement is difficult.

SUMMARY OF THE INVENTION

The aforementioned problems are solved by the present invention. Essentially, an extractor arm assembly for a die cast machine is provided wherein the claw supported by the arm assembly is moved precisely along a linear path. The arm assembly includes a double parallelogram construction to simply, but precisely, insure claw movement in a preselected plane. More particularly, the extractor arm includes a claw, a support structure, a knee, and two sub-arms—the first sub-arm interconnects the support structure and the knee and the second sub-arm interconnects the knee and the claw. The first sub-arm extending between the support structure and the knee includes a pair of links, each of which is pivotally connected to both the support structure and the knee. The pivot points of the two links define a parallelogram. Similarly, the second sub-arm extending between the knee and the claw also includes a pair of links, each of which is pivotally connected to both the knee and the claw. The pivot points of the links of the second sub-arm also define a parallelogram. The extractor arm includes structure, preferably a unique gear arrangement, connected to one link of each arm and a motive power means connected between the sub-arms. This motive power means includes a ram actuator including a cylinder and piston uniquely connected to the arms of the parallelograms to provide the optimum retraction and extension of the arms. The interconnected double parallelogram design of the extractor arm and the unique gear arrangement permits such linear movement while the ram actuator and its connection to the arms gives a wider range of movement to the claw. Further, included is a motive power means for elevating or lowering the arm assembly.

These and other objects, advantages, and features of the invention will be more fully understood and appreciated by reference to the written specification and drawings.

BRIEF DESCRIPTION OF THE DRAWINGS

FIG. 7 is an upwardly perspective view of the knee sub-assembly of the extractor arm assembly.

DETAILED DESCRIPTION OF THE PREFERRED EMBODIMENT

Figure 1:
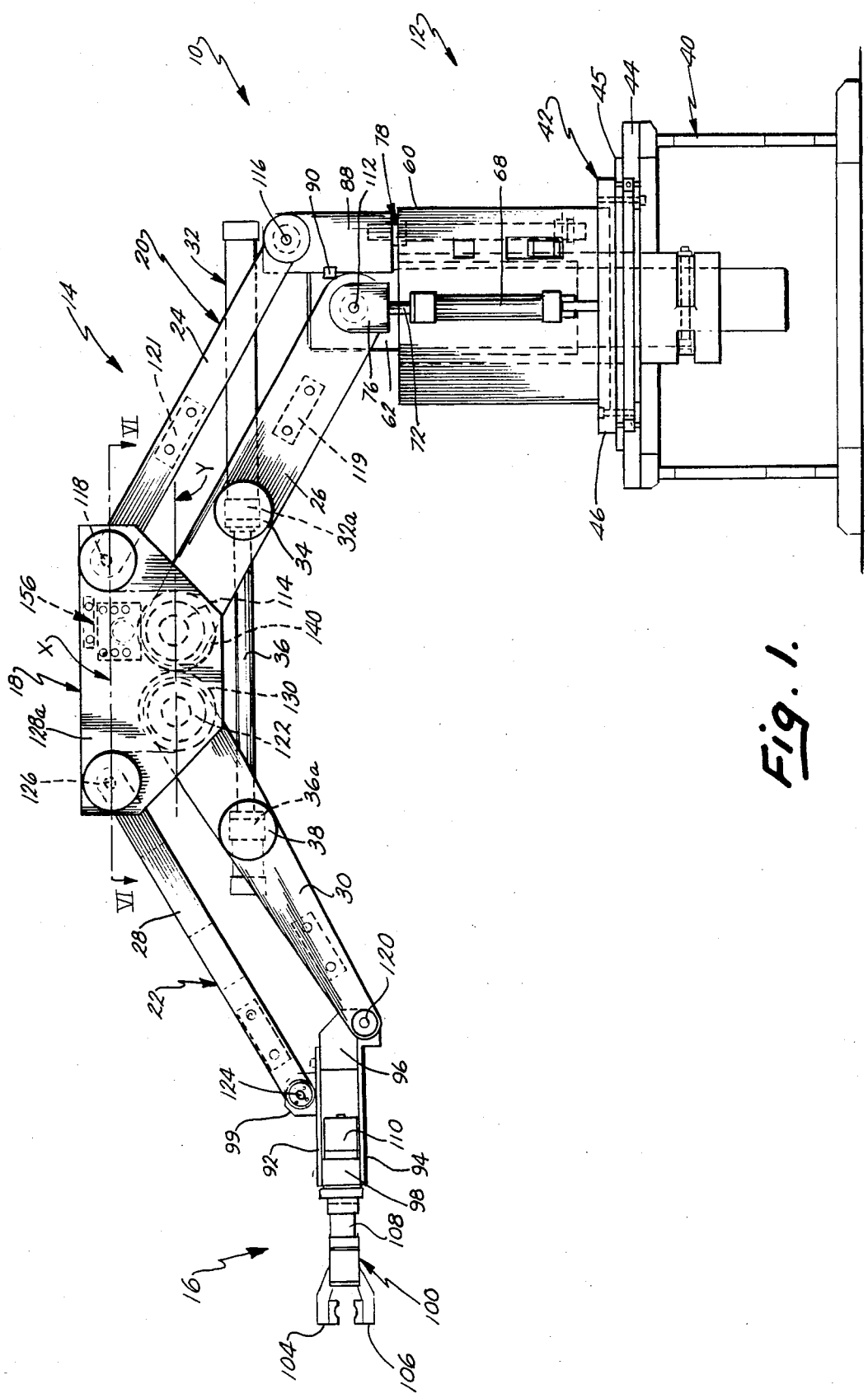
FIG. 1 is an elevational view of the die cast extractor arm assembly of the present invention in the fully extended position.

A die cast extractor apparatus constructed in accordance with a preferred embodiment of the invention is illustrated in the drawings and generally designated 10. The extractor (FIG. 1) includes base or support assembly 12, extendable arm assembly 14 supported by the base, and claw or gripper assembly 16 supported by the arm assembly.

Arm assembly 14 includes knee assembly 18, support-to-knee sub-arm assembly 20, and knee-to-claw sub-arm assembly 22. Sub-arm 20 in turn comprises upper post link 24 and post link 26, each of which is pivotally connected to both support assembly 12 and knee assembly 18 to define a first flexing parallelogram. Similarly, sub-arm 22 comprises upper claw link 28 and claw link 30, each of which is pivotally connected to both claw assembly 16 and knee assembly 18 to define a second flexing parallelogram.

Post link 26 and claw link 30 are fixedly secured to meshing gears 140 and 130, respectively, so that the angular orientation of link 30 is dependent on the angular orientation of link 26. Hydraulic cylinder 32 is pivotally connected to post link 26 by trunion 34 and includes rod 36 pivotally connected to claw link 30 by trunion 38. Therefore, sub-arms 20 and 22 can be moved relative to one another by actuating cylinder 32 so as to extend or retract rod 36. Because of the flexing parallelogram construction of sub-arm 20, the angular orientation of knee assembly 18 with respect to support assembly 12 remains relatively constant regardless of the elevated position of the arm assembly 14. Similarly, the parallelogram construction of sub-arm 22 insures that regardless of the elevated position of arm assembly 14 the angular orientation of claw assembly 16 remains generally constant with respect to knee assembly 18. Of even more importance is that the intermeshing gears 140 and 130 insure that claw assembly 16 travels along a generally linear path in a predetermined plane upon actuation of cylinder 32. Also of extreme importance is the connection of the cylinder 32 and piston rod 36 to the arms to provide a wide range of movement of the arms from the retracted position of FIG. 2 to the extended positions of FIG. 1. Arm assembly 14 thus enables die cast parts to be handled and moved in the manner required to efficiently extract and insert die cast articles in various pieces of equipment.

Support assembly 12 (FIGS. 4 and 5) includes base 40 fixedly secured to the floor. Bearing housing 44 is supported on base 40 to rotatably support swivel plate 42, which includes a toothed or geared circumferential surface 46. Encoder 48 (FIG. 4) is fixedly secured to bearing housing 44 to engage gear 46. Encoder 48 is a commercially available unit and includes a gear (not visible) driven by gear 46 to record the angular orientation of swivel plate 42 on base 40. The angular information is relayed as a digital signal to a digital controller (not shown) used in positioning plate 42.

Figure 4:
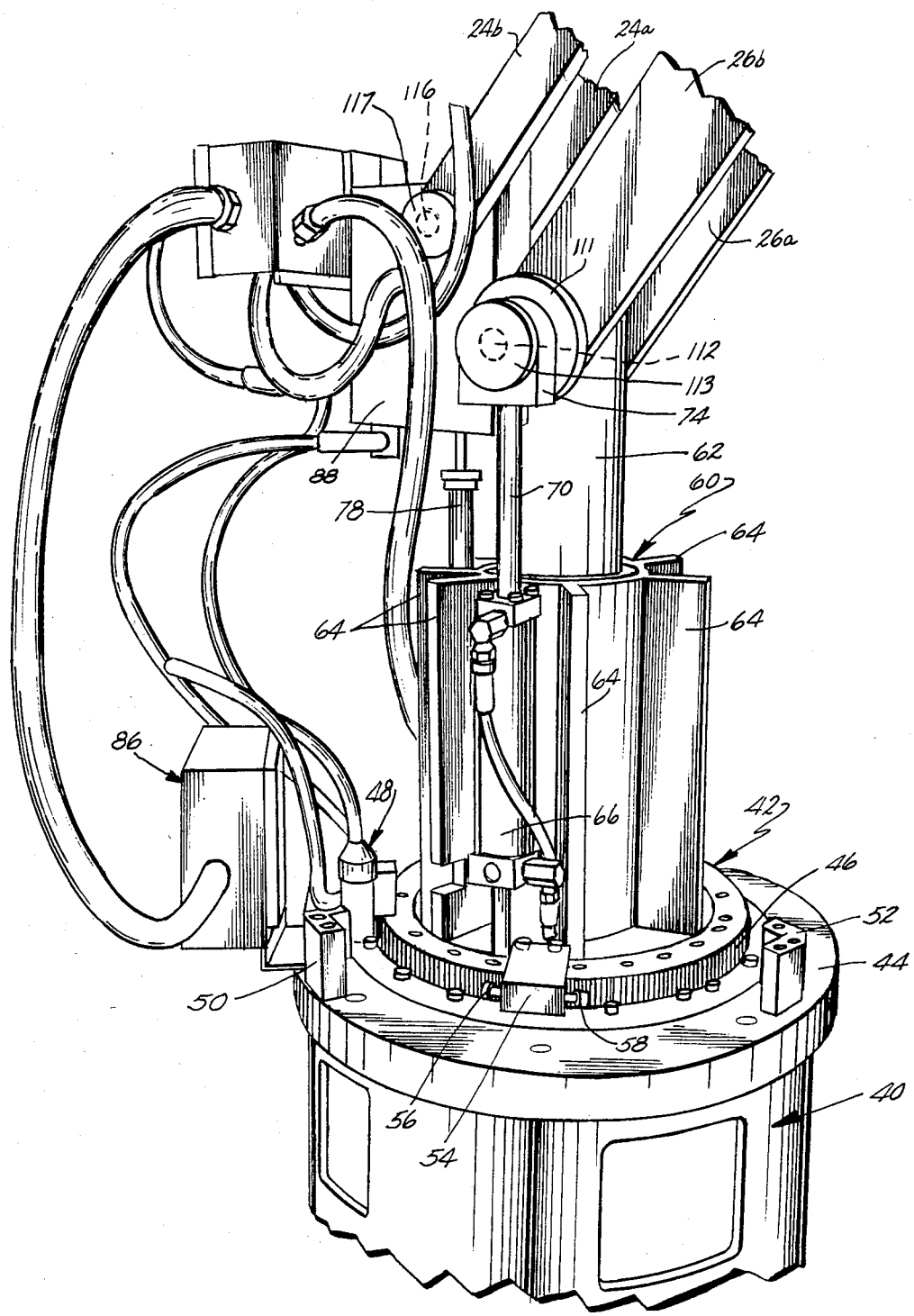
FIG. 4 is a perspective view showing one side of the support base of the extractor arm assembly.

Also supported on bearing housing 44 are a pair of positive stops 50 and 52 (FIG. 4). Stop block 54 is mounted on swivel plate 42 to travel between positive stops 50 and 52 as swivel plate 42 rotates on housing 40. A pair of opposed stop buttons 56 and 58 are threadedly secured within stop block 54 to engage positive stops 50 and 52, respectively. The threaded securement of stop buttons 56 and 58 in block 54 enables the buttons to be "fine tuned" in regulating the position at which they engage stops 50 and 52. Normally, stop buttons 56 and 58 do not engage stops 50 and 52 because the digital controller (not shown) receiving information from encoder 48 will, under normal circumstances, control plate 44. The stops are provided as a safety feature in case the digital control fails.

Figure 5:
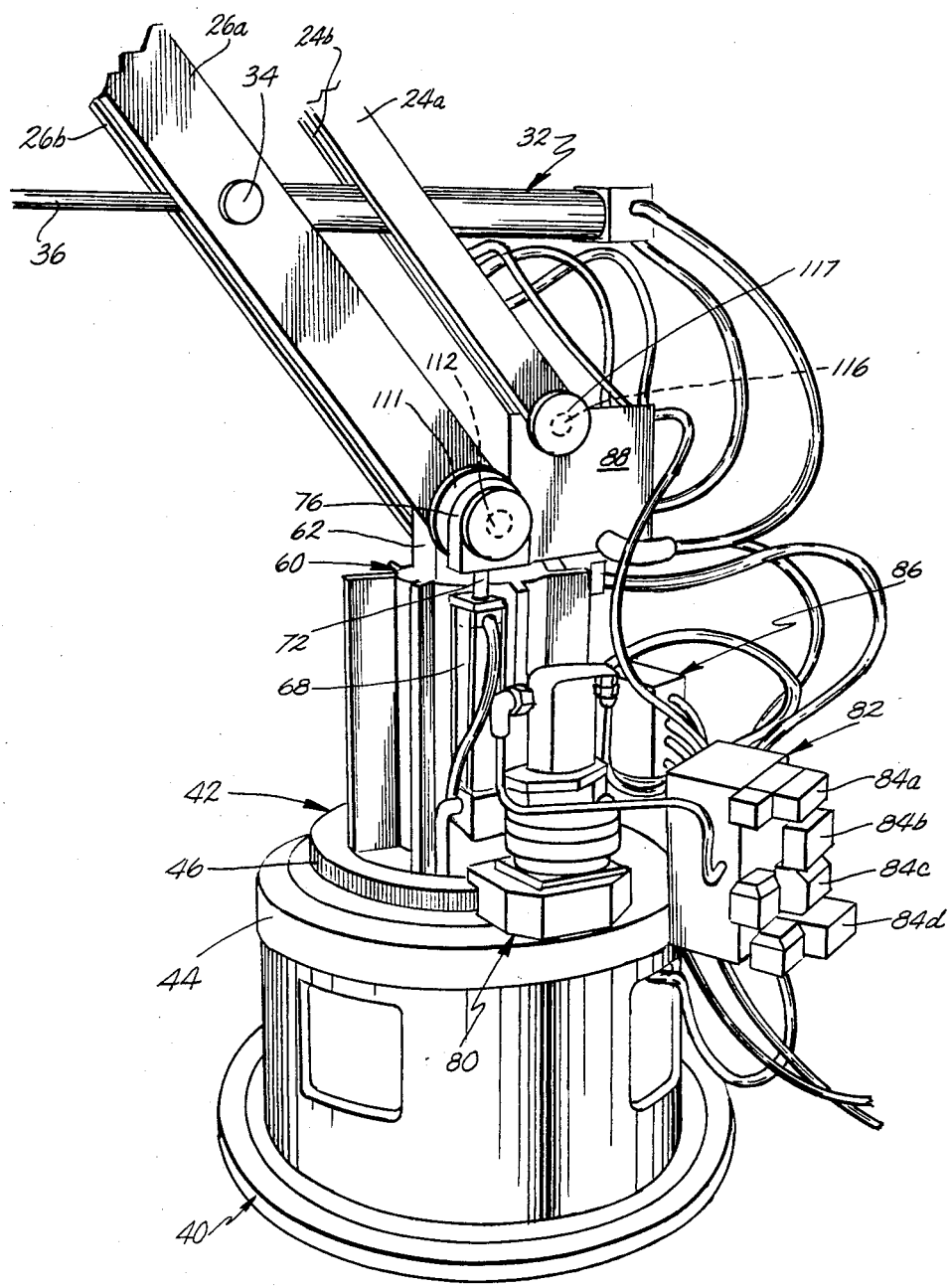
FIG. 5 is a perspective view generally opposite that shown in FIG. 4 of the support base.

Supported on swivel plate 42 is post housing 60 which in turn telescopically receives post 62 (FIGS. 4 and 5). Housing 60 includes a plurality of radial flanges 64 extending the full height of the housing to support the housing on swivel plate 42. A pair of hydraulic cylinders 66 (FIG. 4) and 68 (FIG. 5) are supported on opposite sides of post housing 60 each between a pair of adjacent flanges 64. Each of cylinders 66 and 68 includes a reciprocable rod 70 and 72, respectively, which in turn support rod eyes 74 and 76, respectively. Cylinders 66 and 68 are actuated in unison to raise and lower rod eyes 74 and 76 on rods 70 and 72 to raise and lower post 62 secured therebetween as will be described. Conventional mechanical adjustable stop 78 is included as a safety feature to limit the height to which post 62 can be raised out of housing 60.

Swivel motor 80 (FIG. 5) is supported on bearing housing 44 to rotatably drive swivel plate 42. Swivel motor 80 is a commercially available hydraulic motor and in the preferred embodiment is a CHAR-LYNN 2000 series hydraulic motor. The motor includes a drive gear (not visible) which engages gear 46 on plate 42 to rotate the plate on base 40.

Hydraulic control box 82 (FIG. 5) is also supported on base 40 to provide hydraulic fluid control to motor 80 and lift cylinders 66 and 68. More particularly, the control box includes four valves or switches 84a, 84b, 84c, and 84d which regulate the following hydraulic functions all in a conventional manner:

| Valve | Control |
| --- | --- |
| 84a | Intermediate speed control of motor 80 |
| 84b | Fast speed control of motor 80 |
| 84c | Driving direction of motor 80 |
| 84d | Lift cylinders 66 and 68 |

Similarly, hydraulic control box 86 (FIGS. 4 and 5) is supported on base 40 and provides driving signals to elevate or lower arm assembly 14 and gripper assembly 16 as will be described.

Figure 2:
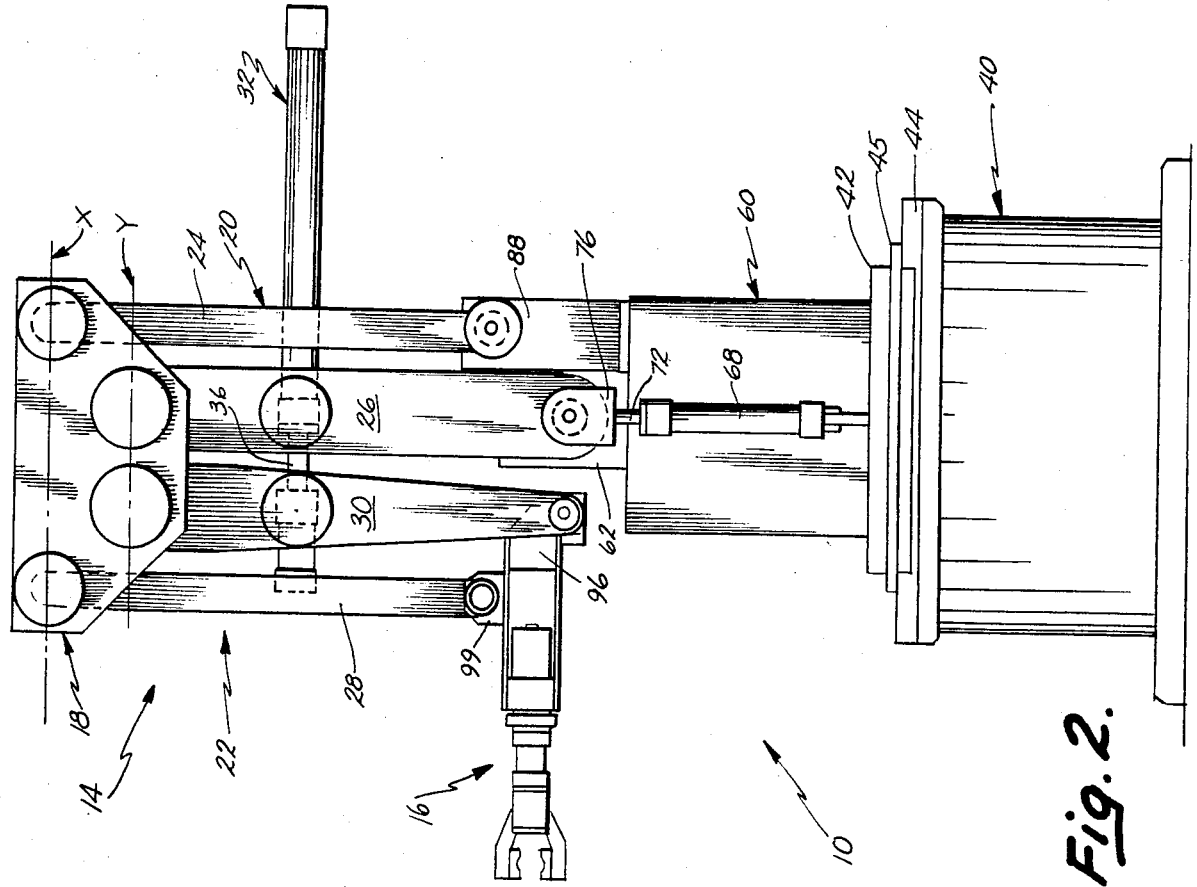
FIG. 2 is an elevational view similar to FIG. 1 showing the arm assembly in the fully retracted or "home" position.

Support arm pivot block 88 (FIGS. 1, 4, and 5) is fixedly secured to the upper end of post 60 by key 90 (FIG. 1). Consequently, support block 88 rides with post 62 and remains in fixed relation thereto.

Figure 8:
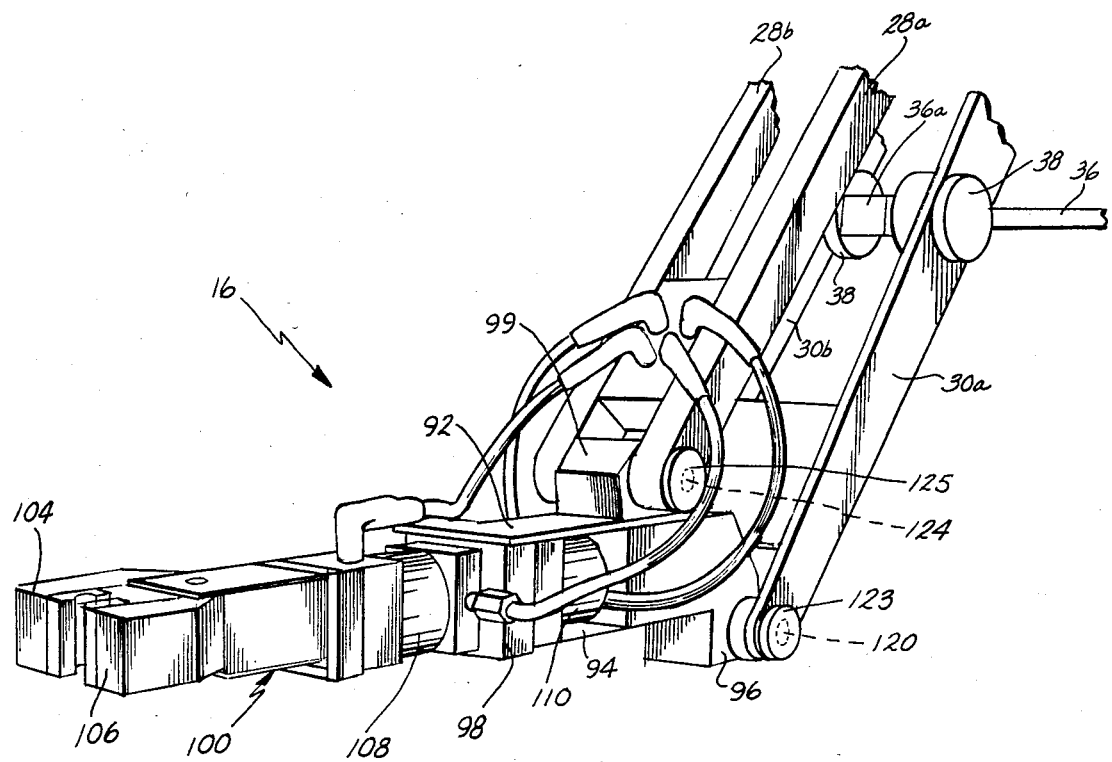
FIG. 8 is a perspective view of the extractor arm claw.

Gripper assembly 16 (FIGS. 1 and 8) comprises a pair of spaced parallel upper and lower mounting plates 92 and 94 and claw link mount 96 and gripper support block 98 secured therebetween. Upper claw link mount 99 is fixedly mounted on the upper surface of upper mounting plate 92. Gripper head 100 is a commercially available unit rotatably secured to support block 98. In the preferred embodiment, gripper head 100 is a Model GH gripper head manufactured by ISI of Frazier, Mich. The head includes a pair of opposed fingers 104 and 106 and pneumatic cylinder 108 which when actuated causes fingers 104 and 106 to close or open. Accordingly, an object may be secured between fingers 104 and 106 by closing the fingers upon the object and the object may be released by opening the fingers. Hydraulic rotary solenoid 110 is fixedly secured to support block 98 opposite gripper head 100 and is interconnected through the block to the gripper head to rotate the gripper head 90° between the position illustrated in FIG. 1 and the position illustrated in FIG. 8. In the preferred embodiment, solenoid 110 is that manufactured by Excello Corporation as the ROTARY MIDGET Model 5-250 2-V. An object secured between fingers 104 and 106 can be rotated 90° by actuating or releasing solenoid 110.

Arm assembly 14 (FIG. 1), because of its double parallelogram construction and intermeshing sub-arms, moves claw assembly 16 in a linear path within a horizontal plane. More particularly, support-to-knee sub-arm assembly 20 comprises a first flexible parallelogram, while knee-to-claw sub-arm assembly 22 comprises a second flexing parallelogram generally identical in size and shape to the first parallelogram.

Sub-arm 20 (FIG. 1) interconnects support assembly 12 and knee assembly 18. Sub-arm 20 comprises post link 26 and upper post link 24, each of which are pivotally secured to support assembly 12 and knee assembly 18. As seen in FIGS. 4 and 5, post link 26 actually comprises a pair of post link halves 26a and 26b which are mounted on opposite sides of post 62 to rod eyes 76 and 74, respectively. One washer 111 is interposed between each rod eye and claw link half. Shaft 112 (with end caps 113) extends through rod eyes 74 and 76, washers 111, post link halves 26a and 26b, and post 62 to pivotally secure post link 26 to the post. The opposite end of post link halves 26a and 26b are fixedly secured to journal blocks 114a and 114b (see also FIG. 6) which are in turn rotatably supported within knee assembly 18 (FIG. 1). Similarly, upper post link 24 comprises a pair of spaced parallel upper post link halves 24a and 24b (see FIGS. 4 and 5), which are pivotally secured to support arm pivot block 88 on shaft 116 (including end caps 117), which extends through the support block and both halves of the claw link. The opposite ends of upper post link halves 24a and 24b are pivotally secured on shaft 118 (see also FIG. 6) in knee assembly 18. The four pivot points connecting post link 26 and upper post link 24 to support assembly 12 and knee assembly 18 define a parallelogram. Therefore, the angular orientation of lines x and y drawn through the connections of links 24, 28 and 26, 30 with respect to knee assembly 18 with respect to support assembly 12 remains the same regardless of the angular orientation of sub-arms 20 and 28. Post link halves 26a and 26b are interconnected by tie bar 119, while upper post link halves 24a and 24b are interconnected by tie bar 121.

Sub-arm 22 (FIG. 1) is somewhat similar to sub-arm 20 and defines a parallelogram generally identical in shape and size to the parallelogram defined by the sub-arm 20. More particularly, sub-arm 22 includes claw link 30 and upper claw link 28, each of which is pivotally secured to both gripper assembly 16 and knee assembly 18. Claw link 30 comprises a pair of claw link halves 30a and 30b (see FIG. 8) both of which are pivotally secured to claw link mount 96 on shaft 120 (including end caps 123). The opposite ends of claw link halves 30 are fixedly secured to journal blocks 122a and 122b, respectively, which are in turn pivotally supported in knee assembly 28 (see also FIG. 6). Similarly, upper claw link 28 comprises a pair of upper claw link halves 28a and 28b (see FIG. 8), which are pivotally secured between claw assembly 16 and knee assembly 18. Each of upper claw link halves 28a and 28b is pivotally secured to upper claw link mount 99 on shaft 124 (including end caps 125). The opposite ends of upper claw link halves 28a and 28b are pivotally received on shaft 126 in knee assembly 18 (see also FIG. 6). Accordingly, the four pivot points 120, 122, 124, and 126 define a flexible parallelogram generally identical in shape and size to the parallelogram defined by sub-arm 20.

Hydraulic cylinder 32 (FIG. 1) is a commercially available double-action unit. Cylinder end 32a is pivotally supported between post link halves 26a and 26b on trunion 34 (see also FIG. 5). Rod 36 is telescopically received within cylinder 32 and includes free end 36a pivotally secured between claw link halves 30a and 30b on trunion 38 (see also FIG. 8). Cylinder 32 is a double acting cylinder so that when rod 36 is telescoped out of cylinder 32, claw link 30 moves away from post link 26 and when rod 36 is drawn into cylinder 32, claw link 30 is drawn toward post link 26. Consequently, sub-arms 22 and 20 can be forced apart or drawn together upon actuation of cylinder 32.

Control box 86 (FIGS. 4 and 5) houses the four hydraulic valves and one pneumatic valve required to effect control of the movement of arm 14 and gripper assembly 16. These valves regulate the following specific functions:

| Valve | Control |
| --- | --- |
| 1 | Direction of movement of rod 36 in cylinder 32 |
| 2 | Fast speed for rod 36 |
| 3 | Intermediate speed of rod 36 |
| Orifice (not shown) | Slow speed of rod 36 created by orifice shunting valves 2 and 3 |
| 4 | Actuation of rotary actuator 110 |
| 5 | Actuation of fingers 104 and 106 |

Knee assembly 18 (FIGS. 6 and 7) provides the interconnection between sub-arms 20 and 22. Assembly 18 includes a pair of spaced parallel knee plates 128a and 128b, which pivotally support links 24, 26, 28, and 30. The pivotal interconnection of knee assembly 18 and any of link halves 26a, 26b, 30a or 30b is generally identical to the others. Consequently, only the pivotal connection between claw link half 30a and knee assembly 18 will be described in detail with the remaining three pivotal connections being the logical equivalent extension thereof.

Figure 6:
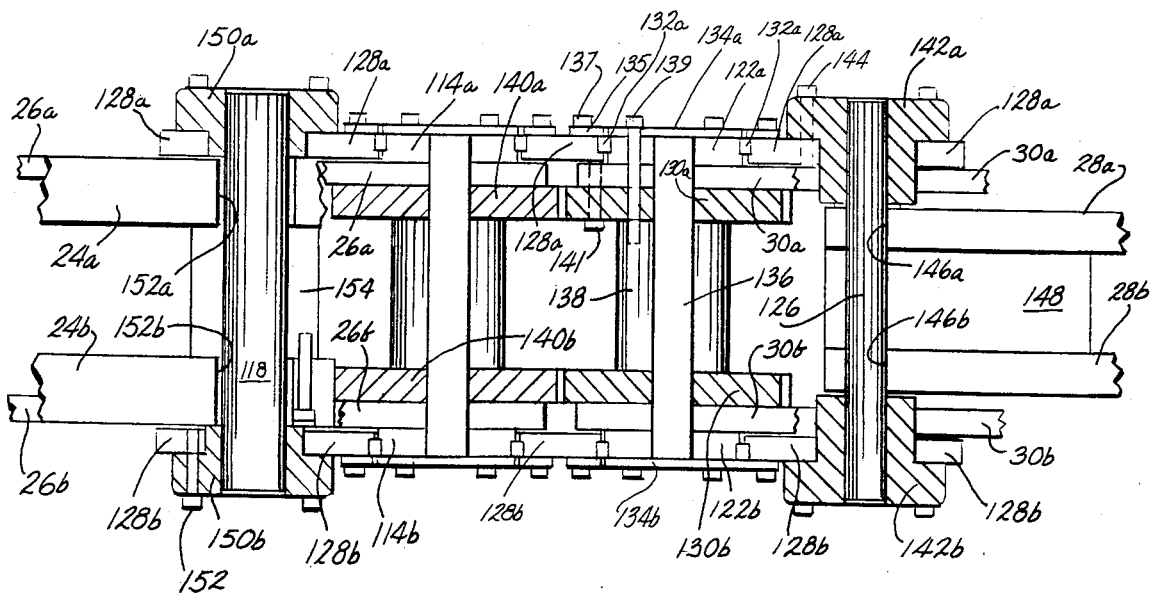
FIG. 6 is a sectional view taken along plane VI—VI in FIG. 1.

Claw link 30a is sandwiched between and fixedly secured to journal block 122a and knee gear 130a (FIG. 6). Journal bearing 122a is rotatably supported in knee plate 128a on ball bearing 132a. Bearing retainer 135 secured to knee plate 128a maintains bearing 132a in position. Journal cap 134a is secured to journal bearing 122a to journal support shaft 136 with opposite journal cap 134b. Knee spacer 138 is positioned about shaft 136 between knee gears 130a and 130b to maintain the knee gears in spaced relation. A plurality of bolts 139 extend through journal cap 134a, journal block 122a, claw link 30a, and knee gear 130a, into knee spacer 138 to secure these sandwiched pieces together. Bolts 141 extend through knee gear 130a into claw link half 30a. Consequently, these elements rotate together as claw link 30 pivots with respect to knee assembly 18. Similarly, knee gear 130b is fixedly secured to claw link half 30b; knee gear 140a to post link half 26a; and knee gear 140b to post link half 26b. Knee gears 130a and 140a interfit so that any rotation of one causes an opposite rotation of the other. Similarly, gears 130b and 140b also mesh. All of knee gears 130 and 140 contain an identical number of teeth to produce a one-to-one turning relationship between the meshing gears.

Upper claw link 28 is also pivotally supported in knee assembly 18 (FIG. 6). Shaft 126 is supported between claw link hubs 142a and 142b which are fixedly secured in knee plate 128a and 128b, respectively, using bolts 144. Both of upper claw link halves 28a and 28b define apertures 146a and 146b, respectively, which closely receive shaft 126. Claw link hub spacer 148 is sandwiched between and secured to upper claw link halves 28a and 28b to maintain the halves in spaced relation.

Upper post link 24 is also pivotally secured to knee assembly 18 (FIG. 6). Shaft 118 is supported within knee assembly 18 between claw link hubs 150a and 150b which are in turn fixedly secured in knee plates 128a and 128b, respectively, using bolts 152. Each of upper post link halves 24a and 24b defines an aperture 152a and 152b, respectively, both of which closely receive shaft 118. Upper post link spacer 154 is sandwiched between and secured to both of upper post links 24a and 24b to maintain the halves in spaced relation.

Knee encoder 156 (FIG. 1) is mounted on knee plate 128a to mesh with knee gear 140a. Knee encoder 156 is a commercially available unit including a driven gear (not visible) which meshes with knee gear 140 to provide an indication of the angular orientation of the knee gear within knee assembly 18. A digital signal is produced by encoder 156 and forwarded to the digital control (not shown) to provide a signal representative of the extension of arm 14. Alternatively, knee encoder 156 could be mounted within knee assembly 18 to cooperate with any other of knee gears 140 or 130, and we have found location of encoder at the opposite end of link 24 at 116 works very well.

Operation

Figure 3:
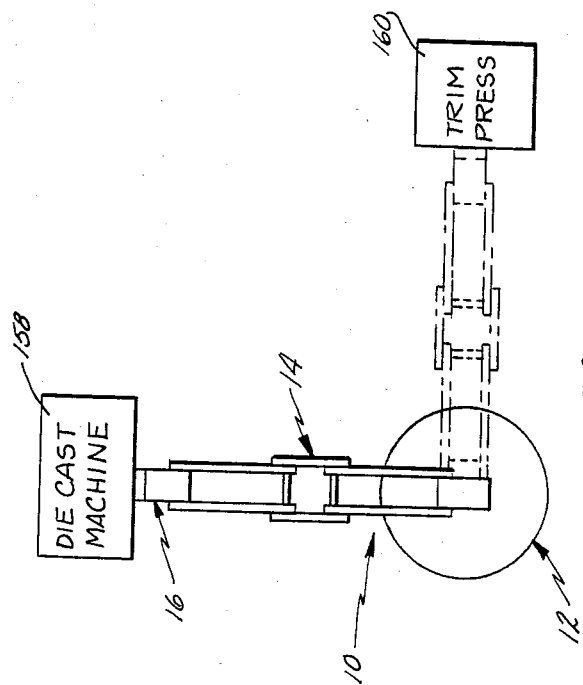
FIG. 3 is a top plan view of the extractor arm assembly extended into a die cast machine, and also showing in phantom the arm assembly extended into a trim press.

One environment in which die cast extractor 10 might be used is illustrated in FIG. 3 wherein the extractor is utilized to move die cast articles from die cast machine 158 to trim press 160. For purposes of describing the operation of extractor 10, the fully retracted position illustrated in FIG. 2 will be denominated the "home" or "fully retracted" position, while any extension of arm 14 from this position would be referred to as an "extended" position. The position of arm 14 illustrated in FIG. 1 will be referred to as the "fully extended" position wherein rod 36 is fully telescoped outwardly from cylinder 32.

Initially, arm 14 is in the home position with gripper assembly 16 facing die cast machine 158. Hydraulic cylinders 66 and 68 are actuated as necessary to orient gripper assembly 16 at the proper vertical height for insertion into die cast machine 158. Cylinder 32 is then actuated to force rod 36 outwardly therefrom causing arm 14 to extend outwardly from support assembly 12. As arm 14 extends, lines x and y drawn through the link connections to knee assembly 18 remain in fixed angular relations with respect to support assembly 12 due to the parallelogram constructions of sub-arms 20 and 22. Similarly, gripper assembly 16 remains in fixed angular orientation with respect to knee assembly 18 and support assembly 12. The intermeshing of knee gears 130 and 140 supports sub-arm 22 and maintains this relationship. The one-to-one rotation ratio between knee gears 130 and 140 insures that a fixed angular movement of sub-arm 20 with respect to knee assembly 18 will result in the same angular movement of sub-arm 22 with respect to the knee assembly.

As arm 14 is extended, the mold of the die cast machine opens and ejector pins push the die cast article out of the mold, which article hangs on the ejector pins. Arm 14 continues its extension until fingers 104 and 106 are positioned about the "biscuit" of the die cast article, namely that portion of the material which remains in the injection port when the article is cast. Pneumatic cylinder 108 is actuated so that fingers 104 and 106 close on the biscuit. Swivel motor 80 is actuated to rotate swivel plate 142 and consequently arm 14 approximately two degrees in a horizontal plane to remove the die cast article from the ejector pins. Hydraulic cylinder 32 is actuated to draw rod 36 into the cylinder returning arm 14 to the home position and drawing the die cast article out of the die cast machine 158.

When fully returned to the home position, extractor 10 is pivoted to face trim press 160 by actuating swivel motor 80 to rotate swivel plate 42 until gripper assembly 16 faces the trim press. Cylinder 32 is again actuated to extend arm 14 toward the trim press until the article supported thereby is positioned directly above trim press 160. Rotary solenoid 110 is actuated to rotate the article 90° in a vertical plane. Cylinders 66 and 68 are actuated to lower post 60, arm 14, and die cast article into trim press 160. Pneumatic cylinder 108 is actuated to release fingers 104 and 106. Cylinders 66 and 68 are again actuated to raise the gripper assembly 16 out of trim press 160, and arm 14 is returned to the home position by fully retracting rod 36.

If the same article-movement operation is to be performed a repeated number of times, the appropriate signals to effect extractor operation can be encoded in a digital controller. In such case, the position of arm 14 is sensed through encoders 48 and 156 so that the arm at any time can simply be programmed to move to a predetermined location. Many different programs can be used to effect this apparent machine intelligence. Such programs are possible to one having ordinary skill in the art given the above disclosure.

The unique construction of arm 14 insures that claw assembly 16 will move along a linear path in a horizontal plane upon actuation of cylinder 32. The unique pivotal connections of the end 32a of cylinder 32 and piston rod end 36a of piston rod 36 provides the optimum range of movement of the arms from the fully retracted position of FIG. 2 to the extended positions such as disclosed by FIG. 1. Thus, die cast articles can be clearly removed from die cast machines and inserted in other machines at right angles. The double parallelogram construction of the arm provides simple but precise geometrics which enable the precise operation of the arm and gripper assembly.

The above description is intended to be that of a preferred embodiment of the invention. Various changes and alterations might be made without departing from the spirit and broader aspects of the invention as set forth in the appended claims, which are to be interpreted in accordance with the principles of patent law, including the doctrine of equivalents.

The embodiments of the invention in which an exclusive property or privilege is claimed are defined as follows:

1. A die cast extractor comprising:
   a support portion;
   a knee portion;
   a claw portion;
   first arm means for supporting said knee portion on said support portion, said first arm means including a pair of first arm members and first pivot means for pivotally connecting each of said first arm members to both of said support portion and said knee portion, said first pivot means defining the corners of a first parallelogram;
   second arm means for supporting said claw portion on said knee portion, said second arm means including a pair of second arm members and second pivot means for pivotally connecting each of said second arm members to both of said knee portion and said claw portion, said second pivot means defining the corners of a second parallelogram; and
   movement means for moving said claw portion linearly relative to said support portion, said movement means including a ram actuator for causing said first and second arm means to be pivoted toward and away from each other said ram actuator including a cylinder in which is located a piston having a piston rod secured to said piston at one end and having its other end extending from one end of said cylinder, said other end of said piston rod being pivotally secured to one of said first arm members; and said cylinder being pivotally secured to one of said second arm members proximate the said one end from which said piston rod extends.

2. A die cast extractor as defined in claim 1 wherein said first and second parallelograms are generally identical in size; and cooperating means comprising means for moving said second arm means an angular amount equal to and opposite the angular amount of movement of said first arm means with respect to said knee portion.

3. A die cast extractor as defined in claim 2 wherein said cooperating means comprises:
first gear means fixedly secured to one of said first arm members; and
second gear means fixedly secured to one of said second arm members, said first and second gears meshing at said knee portion.

4. A die cast extractor as defined in claim 1 wherein said claw portion moves in a generally horizontal plane.

5. A die cast extractor as defined in claim 1 wherein said support portion comprises means for readily rotating said support portion in a horizontal plane and means for readily vertically shifting said support portion.

6. A die cast extractor as defined in claim 1 wherein said claw portion comprises:
jaw means for grasping an article; and
means for rotating said jaw means in a vertical plane to rotate the article secured in said jaw means.

7. An extractor for a die cast machine comprising:
support means;
a knee portion;
claw means for gripping an article;
first upper and lower arm members each extending between and pivotally secured to said support means and said knee portion, each of said arm members being substantially the same length as the other of said arm members, said first arm members defining a first flexing parallelogram, whereby the angular orientation of said knee portion relative said support means remains substantially the same regardless of the movement of said first arm members;
second upper and lower arm members each extending between and pivotally secured to said knee portion and said claw means, each of said second arm members being substantially the same length as said first arm members, said second arm members defining a second flexing parallelogram whereby the angular orientation of said claw means relative said knee portion, and therefore relative said support means, remains substantially the same regardless of the movement of said second arm members, said first and second parallelograms being generally similar in shape;
a first gear portion fixedly secured to one of said first arm members;
a second gear portion fixedly secured to one of said second arm members, said first and second gear portions meshing to provide a one-to-one turning ratio between said gear portions; and
moving means for moving said claw means toward and away from said support means, whereby said claw means moves along a substantially linear path, said moving means including extendable ram means pivotally connected between one of said first arm members and one of said second arm members.

8. An extractor arm as defined in claim 7 wherein said claw means moves in a generally horizontal plane.

9. An extractor arm as defined in claim 7 wherein said support means comprises means for readily rotating said support means in a horizontal plane and means for readily vertically shifting said support means.

10. An extractor arm as defined in claim 7 wherein said claw means comprises:
jaw means for grasping an article in a die cast machine; and
means for rotating said jaw means in a vertical plane, whereby the article can be rotated in a vertical plane.

11. A robot apparatus comprising:
a support portion;
a knee portion;
a claw portion;
first arm means for supporting said knee portion on said support portion, said first arm means including a pair of first arm members and first pivot means for pivotally connecting each of said first arm members to both of said support portion and said knee portion, said first pivot means defining the corners of a first parallelogram;
second arm means for supporting said claw portion on said knee portion, said second arm means including a pair of second arm members and second pivot means for pivotally connecting each of said second arm members to both of said knee portion and said claw portion, said second pivot means defining the corners of a second parallelogram; and
movement means for moving said claw portion linearly relative to said support portion, said movement means including a ram actuator pivotally connected between one of said first arm members and one of said second arm members, said ram actuator including a cylinder in which is located a piston having a piston rod secured to said piston at one end and having its other end extending from one end of said cylinder, said other end of said piston rod being pivotally secured to one of said first arm members; and said cylinder being pivotally secured to one of said second arm members proximate the said one end from which said piston rod extends.

12. A robot apparatus as defined in claim 11 wherein said first and second parallelograms are generally identical in size; and cooperating means comprising means for moving said second arm means an angular amount equal to and opposite the angular amount of movement of said first arm means with respect to said knee portion.

13. A robot apparatus as defined in claim 12 wherein said cooperating means comprises:
first gear means fixedly secured to one of said first arm members; and
second gear means fixedly secured to one of said second arm members, said first and second gears meshing at said knee portion.

14. A robot apparatus as defined in claim 11 wherein said support portion comprises means for readily rotating said support portion in a horizontal plane and means for readily vertically shifting said support portion.

15. A robot apparatus comprising:

support means;
a knee portion;
claw means for gripping an article;
first upper and lower arm members each extending between and pivotally secured to said support means and said knee portion, each of said arm members being substantially the same length as the other of said arm members, said first arm members defining a first flexing parallelogram, whereby the angular orientation of said knee portion relative said support means remains substantially the same regardless of the movement of said first arm members;
second upper and lower arm members each extending between and pivotally secured to said knee portion and said claw means, each of said second arm members being substantially the same length as said first arm members, said second arm members defining a second flexing parallelogram whereby the angular orientation of said claw means relative said knee portion, and therefore relative said support means, remains substantially the same regardless of the movement of said second arm members, said first and second parallelograms being generally similar in shape;
a first gear portion fixedly secured to one of said first arm members;
a second gear portion fixedly secured to one of said second arm members, said first and second gear portions meshing to provide a one-to-one turning ratio between said gear portions; and
moving means for moving said claw means toward and away from said support means, whereby said claw means moves along a substantially linear path, said moving means including means for causing said first and second arm members to be pivoted toward and away from each other.

16. A robot apparatus as defined in claim 1 wherein said support means comprises means for readily rotating said support means in a horizontal plane and means for readily vertically shifting said support means.

17. A robot apparatus comprising:
support means;
a knee portion;
claw means for gripping an article;
first arm means extending between and pivotally secured to said support means and said knee portion;
second arm means extending between and pivotally secured to said knee portion and said claw means, said first and second arm means being generally identical in length;
cooperating means for maintaining the angular orientation of said claw means relative to said support means substantially the same regardless of the movement of said arm means, said cooperating means including a first gear means fixedly secured to said first arm means, said cooperating means further including a second gear means fixedly secured to said second arm means, said first and second gear means meshing to provide a one-to-one turning ratio between said gear portions; and
moving means for expanding and contracting said arm means causing movement of said claw means toward and away from said support means, whereby said claw means moves along a substantially linear path, said moving means including extendable means pivotally connected between said first and second arm means.

18. Apparatus as defined in claim 17 wherein said first and second arm means each include parallelograms generally similar in shape.

19. Apparatus as defined in claim 17 wherein said support means comprises means for readily rotating said support means in a horizontal plane and means for readily vertically shifting said support means.

* * * * *

UNITED STATES PATENT AND TRADEMARK OFFICE
CERTIFICATE OF CORRECTION

PATENT NO. : 4,548,544
DATED : October 22, 1985
INVENTOR(S) : William Van Appledorn It is certified that error appears in the above-identified patent and that said Letters Patent is hereby corrected as shown below:

Column 5, Line 46:

"knee assembly 28" should be --knee assembly 18--

Column 11, Claim 16, Line 1:

"1" should be --14--

Signed and Sealed this

First Day of April 1986

[SEAL]

Attest:

DONALD J. QUIGG

Attesting Officer

Commissioner of Patents and Trademarks